Figure 7:
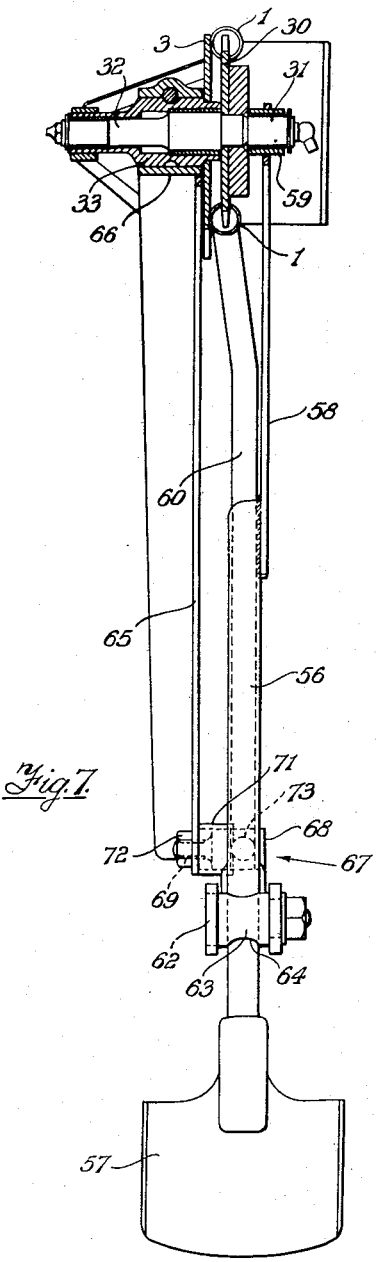

June 19, 1956  W. T. TEAGLE  2,750,666
AGRICULTURAL APPLIANCES
Filed March 17, 1953  5 Sheets-Sheet 1
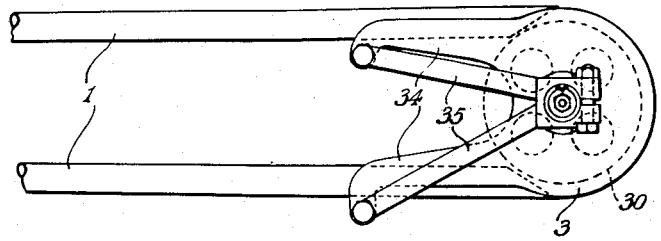
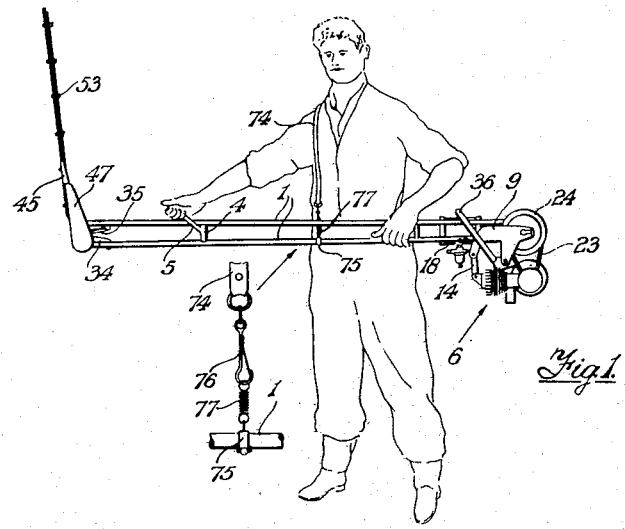
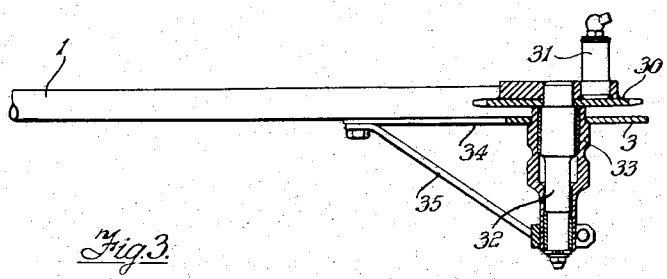
Inventor
William Thomas Teagle
By
Attorneys

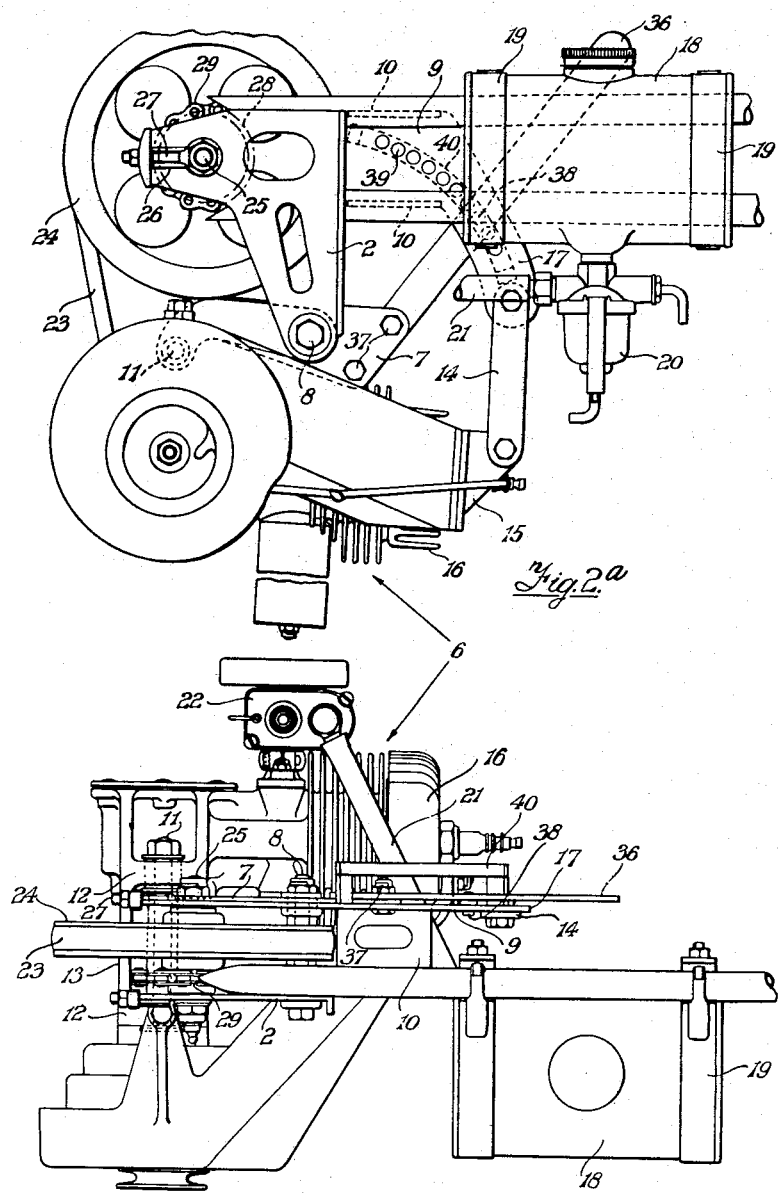

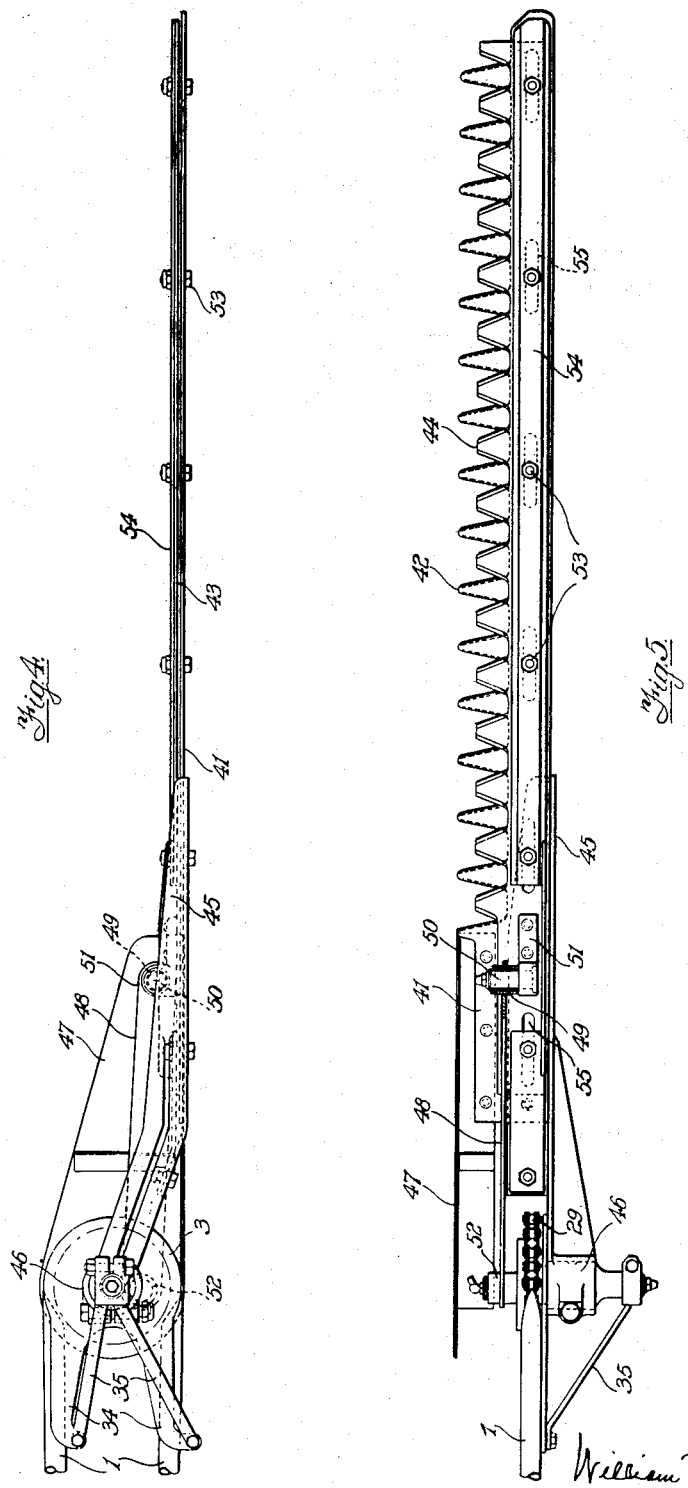

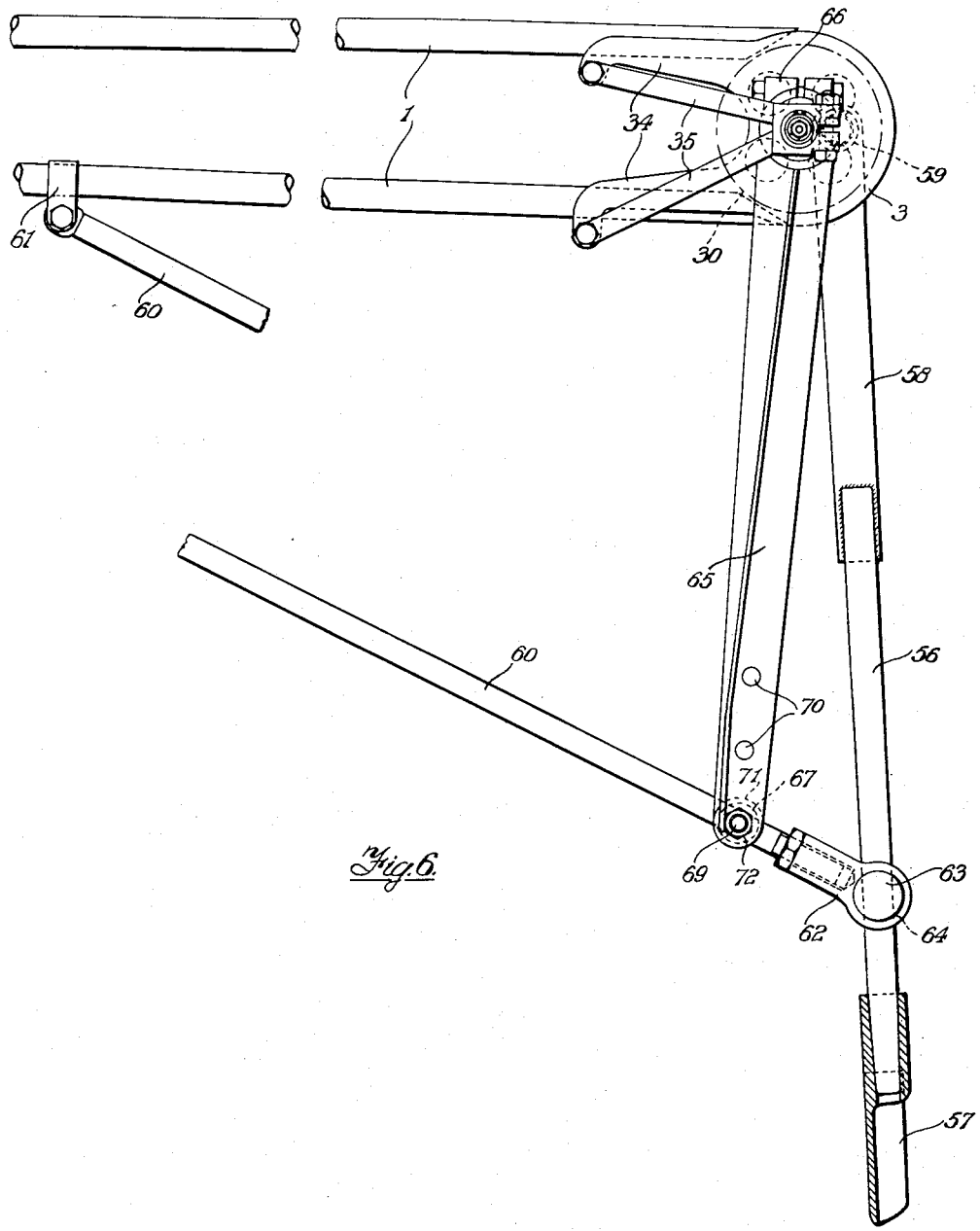

June 19, 1956  W. T. TEAGLE  2,750,666
AGRICULTURAL APPLIANCES

Filed March 17, 1953 5 Sheets-Sheet 5

Inventor
William Thomas Teagle
By
Attorneys

United States Patent Office 2,750,666
Patented June 19, 1956

2,750,666

AGRICULTURAL APPLIANCES

William Thomas Teagle, Blackwater, Truro, England

Application March 17, 1953, Serial No. 343,130

10 Claims. (Cl. 30—218)

This invention relates to agricultural appliances and has for its object to provide a novel or improved form of portable power-operated machine which can be readily adapted for hedge-trimming, weed-cutting, hoeing, cultivating, spraying and similar operations and which can be easily carried and handled by one person.

According to the invention a portable power-operated machine for use in hedge-trimming, weed-cutting, hoeing and like agricultural operations, comprises an elongated frame, a power unit carried on one end of the frame, a workhead at the other end of said frame, and a chain, shaft or similar means for transmitting power from the power unit to the workhead, said transmitting means being enclosed or accommodated within the structure of said frame.

Reference will now be made to the accompanying drawings which illustrate a preferred embodiment of the invention, and in which:

Fig. 1 is a side view drawn to a smaller scale than the other drawings and showing the machine supported upon the body of an operator and having a form of workhead for use in hedge-trimming operatively attached thereto, Fig. 2 is a side view of the driven end of the machine with the workhead removed and Fig. 2a is a side view of the other end of the machine, Fig. 3 is a plan view partly in section of Fig. 2, Fig. 3a is a plan view of Fig. 2a, Fig. 4 is a fragmentary side view showing part of the machine with the form of workhead for use in hedge-trimming operatively attached thereto, Fig. 5 is a plan view of Fig. 4, Fig. 6 is a view similar to Fig. 4 but showing an alternative form of workhead for use in hoeing, and Fig. 7 is an end view of Fig. 6.

Referring now to the drawings the frame of the machine comprises two longitudinal tubular members 1 arranged in spaced and slightly divergent relationship and rigidly interconnected at their rear and forward ends by two plate members 2 and 3 respectively which are welded or otherwise fixed to the tubular frame members. Intermediate their ends the two frame members are interconnected by a cross-tube 4 which is formed with a handle 5 for steadying the machine when in use.

The power unit, which can conveniently take the form of a small petrol engine as indicated generally by the numeral 6, is pivotally suspended from the lower end of the plate member 2 by means of a horizontally disposed double-armed bracket 7 which is pivotally supported on a pin 8 one end of which passes through an aperture in the plate member 2 and the other end of which passes through an aperture in another plate member 9 which is fixed to the opposite side of the frame members 1 from the plate member 2. The plate member 9 is spaced from the tubular frame members and is fixed thereto by two plates 10 which are welded one to each frame member. The engine is pivotally attached to the bracket 7 by a bolt 11 which passes through two mounting lugs 12 on the crank case 13 of the engine and to which the rearward ends of the two parallel arms of the bracket 7 are pivotally connected. The engine is further supported by a vertically disposed link 14 which is pivotally connected at its lower end to a bracket 15 bolted to the cylinder head 16 of the engine and at its upper end to an arcuate extension 17 of the plate member 9.

The engine is supplied with fuel from a tank 18, which is fixed to the frame members 1 by two circular metal straps 19, and through a bowl 20 and a flexible conduit 21 to the carburettor 22. A remote throttle control (not shown) of known type is preferably provided, the hand lever of said control being attached to one of the tubular frame members at any convenient position.

The drive is taken off the engine by means of a belt 23 which passes around a small pulley (not shown) fixed to the crankshaft (not shown) and a relatively larger pulley 24 rotatably mounted on a spindle 25 which is supported within two open-ended slots 26 cut one in each of the two rear plate members 2 and 9. The spindle 25 is held securely within the slots by means of two draw bolts 27 of the well-known form employed in bicycle rear wheel assemblies. Secured to the pulley 24 for rotation therewith around the spindle 25 is a sprocket 28 around which passes a driving chain 29. The chain passes through the tubular frame members 1 and around a second sprocket 30 which is rotatably mounted at the forward end of the frame and to which there is eccentrically fixed a crank-pin 31. The rotational mounting for said sprocket is provided by a shaft 32 to which the sprocket is fixed and which is rotatably supported in a bush 33 fixed centrally of the plate member 3. The latter is of bifurcated form having two arms 34 by which it is fixed to the frame members 1 and to the ends of which there are secured two struts 35 which support the end of the bush 33 remote from the plate member 3.

The tension of the driving belt 23 can be adjusted by pivoting the engine about its point of connection with the link 14. This pivotal movement of the engine is effected by angular adjustment of the double-armed bracket 7 about the pivot pin 8 under the control of a hand lever 36 which is secured to the bracket 7 by bolts 37. The engine can be adjusted to any one of a number of positions which can conveniently be determined by the engagement of a stud 38 on the lever 36 with any one of an arcuate series of holes 39 formed in the plate member 9. An arcuate guide bar 40 is fixed to the plate member 9 to prevent excessive displacement of the lever 36 during adjustment. A sufficient degree of such adjustment will effect disengagement of the drive from the crankshaft pulley to the pulley 24. As an alternative to the stud 38 and holes 39 for locating the lever 36 accurately in the position to which it is adjusted there may be provided a nut and a bolt member (not shown) mounted on the lever 36 and operating in an arcuate slot (not shown) in the plate member 9. As a further alternative there may be provided an arcuate ratchet member (not shown) mounted on the plate member 9 and whose teeth are adapted to be engaged by a spring-loaded pawl (not shown) provided on the lever 36.

The tension of the driving chain 29 can be adjusted by means of the draw bolts 27 in the well-known manner in which the tension of bicycle chains is adjusted.

One form of work head for use in trimming or cutting hedges, weeds and the like is shown in Figs. 4 and 5 and includes a fixed cutter-bar 41 with teeth 42 and a movable cutter-bar 43 with teeth 44. The fixed cutter bar is secured at its rear end to an elongated bracket 45 which is formed with a circular clamp 46 adapted for attachment to the bush 33 at the forward end of the frame. A side-plate 47 is secured to the edge of the fixed cutter-bar opposite the bracket 45 to provide a guard for the sprocket 30 and also for a connecting rod 48 by which the drive is transmitted from the sprocket 30 to the movable cutter-bar 43. At its forward end the connecting-rod is formed with a bush 49 which surrounds a short shaft 50 projecting from a lug 51 fixed to the movable cutter-bar 43, and at its rear end the connecting-rod is formed with a second bush 52 for connection to the crank-pin 31. Thus the connecting-rod translates the rotational movement of the sprocket 30 into a reciprocatory movement of the movable cutter-bar. The latter is guided in its movement by bolts 53 which are secured to the fixed cutter-bar 41 and an upper fixed bar 54, and which pass through slots 55 formed in the movable cutter-bar.

By virtue of the manner in which the hedge-trimming workhead described above is supported by the frame, viz. by the circular clamp 46 which is arranged coaxially with the sprocket 30, the workhead is angularly adjustable relative to the frame (as shown in Fig. 1) and can thus be operated in any desired plane. This facilitates the use of the machine in cutting, inter alia, the sides of hedges, the tops of tall hedges and weeds at ground level.

An alternative form of workhead for use in hoeing is shown in Figs. 6 and 7 and consists of a stout metal rod or tube 56 provided at one end with a hoe-blade 57 and rigidly fixed, for example by welding, at its other end to a flat bar 58 which forms an offset extension of the tube 56 and which is formed with a bush 59 for connection to the crank-pin 31. Intermediate its ends the hoe is supported by a stay 60 one end of which is secured to the lower frame member 1 by a lug 61 and the other end of which is provided with a bifurcated member 62 supporting a swivelling block 63. The latter is formed with a bore 64 through which slides the rod or tube 56 to which the hoe-blade is attached. Intermediate its ends the stay 60 is connected to the lower end of a strut 65 whose upper end is provided with a circular clamp 66 for attachment to the bush 33. The stay 60 is connected to the strut 65 by means of a clamp 67 which consists of a cylindrical block 68 formed with a screw-threaded shank 69 for engagement with one of a number of apertures 70 in the strut 65. The inner portion of the block 68 is surrounded by a collar 71 and a nut 72 is provided on the shank 69. The stay 60 passes with a sliding fit through a bore 73 in the block 68 so that the clamp is thus slidably adjustable along the stay 60 and is secured thereto by tightening the nut 72. This has the effect of drawing the block 68 into the collar 71 and clamping the stay 60 against the edge of said collar. By means of this arrangement and the circular clamp 66 the hoe is angularly adjustable relative to the frame in a manner similar to that of the hedge-trimming workhead described earlier herein.

The arrangement of the swivelling block 63 has the effect of imparting ellipticity to the movement of the hoe blade and by altering the point of attachment of the stay 60 to the strut 65, which alteration is effected by moving the clamp 67 from one of the holes 70 to another, the minor axis of the ellipse described by the tip of the hoe-blade can be varied.

For supporting the machine there is provided a strap 74 which is attached to the frame, as shown in Fig. 1, by adjustable circular clips 75 and spring clips 76 at each end of the strap. Coil springs 77 are interposed between the spring clips 76 and the circular clips 75. By adjusting the circular clips along the frame the operator can select the point of balance between the workhead and the power unit so that the two counterbalance one another.

Other forms of workhead may be substituted where desired. For example, in the case of spraying equipment, the workhead may comprise a spray device and a pump for feeding it, the liquid for spraying being drawn from a container carried by the operator.

I claim:

1. A portable power-operated machine for agricultural operations, comprising an elongated tubular frame, a power unit carried on the rear end of the frame, a reciprocatory tool projecting from the forward end of the frame, power transmitting means enclosed in the frame for driving the tool from the power unit, driving means for the tool including a rotary member driven from the power transmitting means, a bushing secured to the frame at its forward end and rotatably supporting said rotary member therein, and a crank mechanism driven by said rotary member and connected to the tool for converting rotational movement of said member into reciprocatory movement of the tool, and a supporting member for the tool having means for clamping it on said bushing for attaching the tool to the frame, said clamping means being adjustable around the bushing to vary the angle at which the tool projects from the frame.

2. A portable power-operated machine as defined in claim 1, wherein said frame consists of two tubular members arranged in spaced, divergent relationship and through which said power transmitting means passes, and plate members rigidly interconnecting said tubular members at their ends, said plate members providing means for supporting the power unit and detachably supporting the tool at the rear and forward ends respectively of the frame.

3. A portable power-operated machine as defined in claim 2, including a pulley rotatably mounted at the rear end of the frame, a belt for transmitting power from the power unit to said pulley, a sprocket connected to said pulley, a chain driven from said sprocket and passing through the tubular frame members, and a second sprocket rotatably mounted at the forward end of the frame and to which power from the power unit is transmitted by said chain.

4. A portable power-operated machine as defined in claim 3, including a spindle on which said pulley and the sprocket connected thereto are rotatably mounted, two spaced parallel plate members at the rear end of the frame having open-ended slots in which said spindle is mounted, and draw-bolts to securely hold said spindle in said slots and maintain adjustment of the tension on the power transmitting chain.

5. A portable power-operated machine as defined in claim 4, wherein the power unit is pivotally suspended from said plate members at the rear end of the frame for adjustment of the tension of the driving belt and to engage and disengage the drive from the power unit to said pulley, and including a manually operable lever for controlling the pivotal adjustment of the power unit, and means for locating said lever in any one of a plurality of positions to which it is angularly adjustable.

6. A portable power-operated machine as defined in claim 5, wherein the power unit is pivotally supported by a vertically disposed link whose upper end is pivotally connected to the power unit at one side of its pivot, and by a horizontally disposed bracket to one end of which the power unit is pivotally connected adjacent to its pivot and to the other end of which a manually operable lever is fixed, said bracket being pivotally supported intermediate its ends by said plate members.

7. A portable power-operated machine as defined in claim 1, wherein said tool comprises a fixed toothed cutter-bar and a movable toothed cutter-bar, said fixed cutter-bar having rigidly secured thereto a bracket adapted to be attached to the frame of the machine, and the movable cutter-bar having coupled thereto one end of a connecting rod, and including a sprocket at the forward end of the frame to which the drive from the power unit is transmitted and having a crank-pin fixed eccentrically thereto and to which the other end of said connecting rod is connected for translating rotational movement of said sprocket into reciprocatory movement of the movable cutter-bar.

8. A portable power-operated machine as defined in claim 7, including a spindle for supporting said sprocket, and wherein said bracket secured to the fixed cutter-bar is formed with a circular clamp to engage around a bush in which the spindle of the sprocket at the forward end of the frame is rotatably supported.

9. A portable power-operated machine as defined in claim 1, wherein said tool comprises a rigid elongated member having a hoe-blade secured to one end thereof and formed at its other end with a bush, a sprocket mounted at the forward end of the frame to which the drive from the power unit is transmitted and having an eccentric crank-pin fixed thereto and to which the bush is connected, and a swivelling block mounted at one end of a stay whose other end is attached to the frame of the machine and in which said elongated member is slidable for translating rotational movement of said sprocket into an elliptical movement of the hoe-blade.

10. A portable power-operated machine as defined in claim 9, including a strut having means at one end for attachment to the stay intermediately of its ends, said means being adjustable longitudinally of the strut, and means at the other end of the strut for attachment to the frame of the machine for angular adjustment of said tool relatively to the frame of the machine.

References Cited in the file of this patent

UNITED STATES PATENTS

| | | |
|---|---|---|
| 1,098,032 | Fox | May 26, 1914 |
| 1,693,707 | Dishmaker | Dec. 4, 1928 |
| 2,551,821 | Bengtson | May 8, 1951 |

FOREIGN PATENTS

| | | |
|---|---|---|
| 399,638 | Germany | Aug. 7, 1924 |
| 170,530 | Switzerland | Jan. 12, 1934 |
| 645,960 | Great Britain | Nov. 15, 1950 |